US008344542B2

(12) United States Patent  (10) Patent No.: US 8,344,542 B2
Micallef et al.  (45) Date of Patent: Jan. 1, 2013

(54) APPARATUS AND METHOD TO POWER 2-WIRE FIELD DEVICES, INCLUDING HART, FOUNDATION FIELDBUS, AND PROFIBUS PA, FOR CONFIGURATION

(76) Inventors: Charles John Micallef, Peachtree City, GA (US); Charles Hoagland Ostling, Newman, GA (US); Carol Parks, Newman, GA (US)

( * ) Notice: Subject to any disclaimer, the term of this patent is extended or adjusted under 35 U.S.C. 154(b) by 277 days.

(21) Appl. No.: 12/798,470

(22) Filed: Apr. 3, 2010

(65) Prior Publication Data

US 2010/0259101 A1  Oct. 14, 2010

Related U.S. Application Data

(60) Provisional application No. 61/167,959, filed on Apr. 9, 2009.

(51) Int. Cl.
*H02J 3/00* (2006.01)

(52) U.S. Cl. ............................................... 307/26

(58) Field of Classification Search .......... 307/12, 307/26, 36; 702/85, 184; 710/72, 62
See application file for complete search history.

(56) References Cited

U.S. PATENT DOCUMENTS

| 6,304,934 B1 * | 10/2001 | Pimenta et al. ............... 710/305 |
| 6,697,684 B2 | 2/2004 | Gillen |
| 6,959,356 B2 | 10/2005 | Packwood et al. |
| 7,167,537 B2 | 1/2007 | Loechner |
| 2003/0236937 A1 * | 12/2003 | Barros De Almeida et al. ............... 710/305 |
| 2004/0199681 A1 | 10/2004 | Hedtke |

\* cited by examiner

*Primary Examiner* — Jared Fureman
*Assistant Examiner* — Carlos Amaya
(74) *Attorney, Agent, or Firm* — J.T. Hollin, Attorney at Law, P.C.

(57) ABSTRACT

Disclosed is a power assembly for supplying electrical power to 4-20 mA 2-wire field devices, including HART-enabled, short run Profibus PA, and Foundation Fieldbus protocols. A preferred embodiment of the power assembly is designed to simplify the testing, troubleshooting, and configuration of HART 2-wire field devices. The disclosed device is compatible with hand-held or PC-based configuration software, and utilizes the available power from the USB port of a laptop, or any other compatible source of low-voltage DC. An internal circuit converts the low voltage DC to 24-volt DC to provide 2-wire power for the field devices. The power supply includes the necessary network communication load and/or resistance and may provide a quick modem/network interface and/or milliamp meter connection. All the necessary connections to the 2-wire field device are made with a single pair of quick-disconnect fittings.

25 Claims, 5 Drawing Sheets

APPARATUS AND METHOD TO POWER 2-WIRE FIELD DEVICES, INCLUDING HART, FOUNDATION FIELDBUS, AND PROFIBUS PA, FOR CONFIGURATION

REFERENCE TO RELATED APPLICATION

This application claims the benefit of priority of U.S. provisional application Ser. No. 61/167,959 filed on Apr. 9, 2009, and said provisional application is incorporated herein by reference.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

At the time of initial building, renovating, or commissioning of an industrial facility it is important to ensure that all field devices such as pressure transducers, flow meters, and various other regulating or measurement devices are properly configured for their intended monitoring and/or reporting functions. All of these field devices must be preconfigured and calibrated before installation for their prescribed application. When errors occur, either in the application of the field device, or by the incorrect configuration of a field device, the results can be damaging, expensive, or even injurious to work personnel.

It is very common at industrial facilities that multiple devices of the same type may function in a variety of applications and locations. If, for instance, a pressure transmitter calibrated at 50 psi maximum is mistakenly placed in an application calling for regulating fluid pressure at 200 psi, it may take considerable time and resources to track down this mistake. This could also indicate that the unit designated for regulating at 200 psi has been installed at another, unknown location. Or, perhaps, the 50 psi device was set up incorrectly by the factory or the plant installation crew. In either scenario, it would take further troubleshooting to pinpoint the cause, naturally resulting in additional commissioning time.

As another example, a field device is initially preconfigured and calibrated. During commissioning of the facility, the configuration of the device is found to be valid but a routine test reveals the device is out of tolerance and requires calibration. This change in the desired calibration may have occurred during shipment or installation. During installation, the most common causes for such a problem are over-tightening, accidentally dropping the device or, in some cases, incorrect orientation within its immediate physical location.

HART-enabled 4-20-mA field devices can prevent errors like these. In such devices, the standard 4-20 mA analog data acquisition channel is supplemented by a digital channel supporting read/write access of data relating to a field device. With HART-enabled software, field devices are configured and calibrated at the time of installation, minimizing errors and commissioning time, or any other time as deemed appropriate by the owner. Briefly, the HART Communication Protocol (Highway Addressable Remote Transducer) defines a bi-directional field communication protocol standard for instrument, control and automation devices and systems. It is a global standard for sending and receiving digital information across analog wires between smart devices and host systems and is supported by leading instrmentation and control suppliers such as ABB, Emerson, Honeywell, Siemens and many others. A host can be any software application, including, but not limited to, a technician's hand-held device, a laptop, or a plant's process control computers, its asset management system, or any other system utilizing a control platform.

It must be appreciated that it takes considerable resources (including but not limited to manpower, time, and equipment) to configure hundreds, or even thousands of field devices in a single facility. The inventive concept presented herein generally relates to an apparatus and a method to consolidate all the components and circuitry required to provide the necessary power required for a HART 2-wire field device, communicate with it, and provide necessary interconnections to the device, with minimal wiring to the device reducing overall time requirements in order to facilitate the configuration.

(2) Description of the Related Art

Currently, end users attempting to configure 2-wire field devices using the HART protocol require a nominal 24-volt DC power supply, a HART network load, and numerous connections to the device, such as a milliamp meter, a HART communicator, or a HART PC modem. The plurality of connections requires time to arrange, invites the possibility of connection errors, and makes a standardized configuration process difficult to achieve. There is no known self-contained device that performs the functions as described in this disclosure, rather, such functions are generally performed by manual manipulation of the various connectors, lead wires, meters, and other equipment necessary to achieve the same results.

There are various mechanisms and systems in current use that are effective at regulating power to a field device, remotely managing a field device, or tracking and providing an alert of maintenance problems pertinent to field devices.

In a published patent application US 2004/0199681, the inventor (Hedtke, 2004) devised a two-wire process transmitter for use in monitoring an industrial process which includes HART communication circuitry and an alternative second configuration with a second pair of electrical terminals to couple Fieldbus communication circuitry to the two-wire process control loop.

U.S. Pat. No. 6,697,684 (Gillen, 2004) discloses a programmable field measuring instrument comprising a power assembly, a connector terminal, and a software protection device. The field device may thus transmit not only its conditioned measuring signal but also other functionalities or data, as programmed by the power assembly.

The inventor in U.S. Pat. No. 7,167,537 (Loechner, 2007) devised a valve controller with a 4-20 mA input interface circuit capable of communicating with a two-wire loop. The invention also comprises a processor that communicates data with the interface circuit, which processor is operable to generate a control signal for controlling the valve position.

U.S. Pat. No. 6,959,356 (Packwood, et al, 2005) features a multi-protocol smart field device which uses a Fieldbus communication protocol to communicate process control information and uses a HART communication protocol to enable local configuration of the field device via a hand-held HART communicator.

BRIEF SUMMARY OF THE INVENTIVE CONCEPT

The inventive concept herein discloses an apparatus and method to assist an end user in optimizing the process of powering and configuring HART-enabled, "smart" field devices. Typically, an end user must gather at least four basic components to begin the process of configuring a field device: (1) a HART compatible transmitter, (2) a HART modem with PC configuration software or a HART handheld communicator, (3) a 24-volt power supply, and (4) HART network loading components. The device and method disclosed herein are designed to facilitate and simplify the connection of a power source, modem, and current devices to a 2-wire HART device. It may further be used on other 2-wire powered devices wherein the voltage and current are appropriate and where the network load is compatible, such as short run Profibus PA, or Foundation fieldbus protocols.

Essentially, the inventive concept consists of a power assembly with a power lead connectible to the USB port of a computer (or any other port with sufficient power availability), two-wire leads with quick-disconnect terminals attachable to a field device, a connector to accept the input from a modem, and an output jack for transmitting to a digital multimeter or a milliamp meter.

BRIEF DESCRIPTION OF THE VIEWS OF THE DRAWINGS

The objects, features, and advantages of the concept presented in this application are more readily understood when referring to the accompanying drawings. The drawings, totaling four figures, show the basic functions of various embodiments and components. In the several figures, like reference numbers are used in each figure to correspond to the same component as may be depicted in other figures.

NOMENCLATURE FOR INVENTION COMPONENTS

1. Power assembly
2. Banana jack for modem/handheld
3. Banana jack for modem/handheld
4. Low voltage DC source
5. DC/DC conversion circuit
6. Filter circuit
7. Filter circuit power output
8. Power-on indicator [indicates input power]
9. Current detection limiting/indicating circuit
10. Current measuring & indication circuit
11. Current shunt diode
12. Digital multimeter (DMM)
13. Connection plug
14. Connection jack
15. Casing for power assembly
16. HART modem
17. HART hand-held communicator
18. HART FSK optimizing filter
19. HART communication detection circuit
20. Milliamp meter
21. Power-on indication (output)
22. Laptop
23. Lead from laptop to modem
24. USB power cable
25. Lead from modem to power assembly
26. Lead to milliamp meter
27. Leads for quick disconnects
28. Quick connection adapter 1
29. Quick connection adapter 2
30. HART device
31. Black test jack
32. Red test jack
33. USB connector
34. USB port
35. Fieldbus power conditioner
36. Fieldbus communication detection and indication circuit
37. Fieldbus network load
38. Foundation/Profibus PA modem/network interface
39. n/a
40. AC-DC power connections (5)
41. HART network load
42. Current measurement connections
43. Terminals of HART field device
44. HART field device
45. AC plug
46. Over-current detection & protection
47. amp/volt analog-digital conversion

DETAILED DESCRIPTION OF THE INVENTIVE CONCEPT

Figure 1:
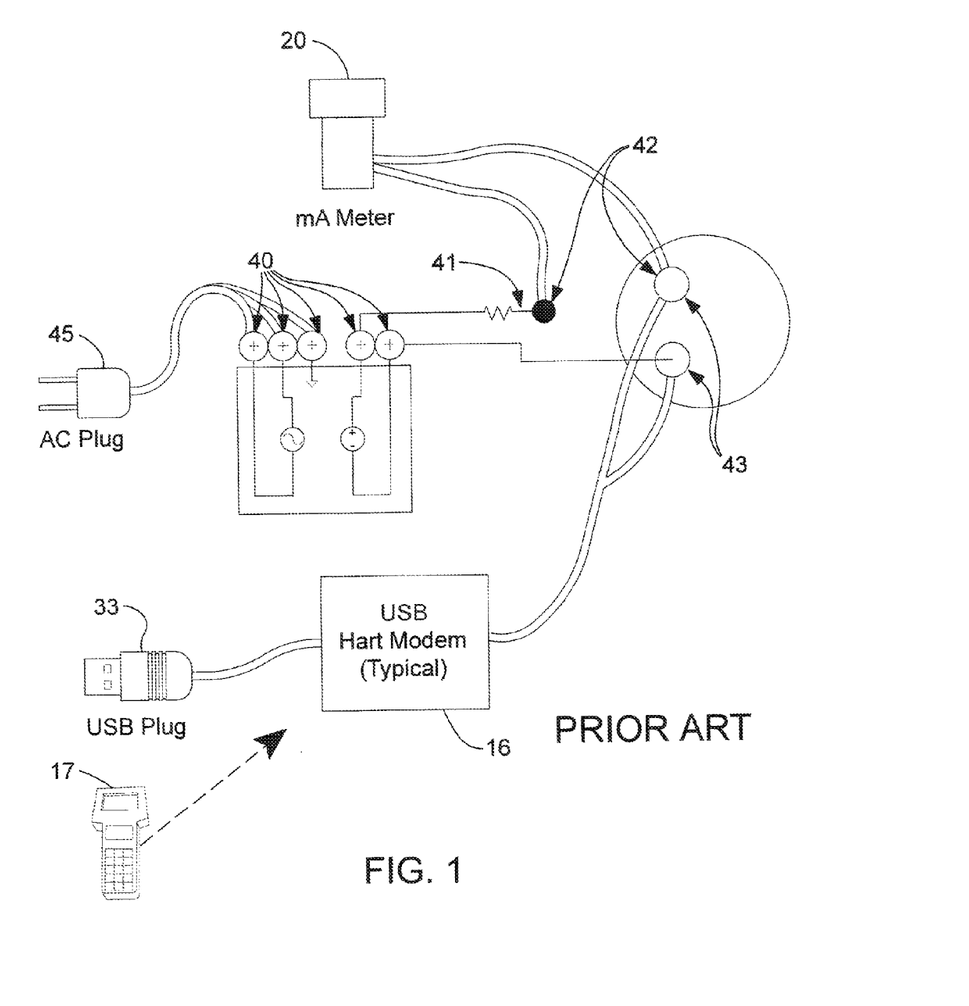
FIG. 1 shows a schematic diagram of the prior art of this technology

FIG. 1 is a typical wiring diagram of the connections and equipment used in most present methods of configuring field devices. First, the end user or technician must provide a DC power supply. If conveniently available, the technician may use an extension cord with an AC plug 45 inserted into a power outlet. The AC power supply must then be converted into a 24-volt DC power supply 40. Also needed are a HART network load of a prescribed value 41, several jumper wires with alligator clips or the like, two current measurement connections 42, a milliamp meter 20, and a HART modem 16. The HART modem may possibly be powered through a USB connector 33 from a laptop computer. The HART modem 16 (or possibly a HART hand-held communicator 17) is then connected to the appropriate terminals 43 of the HART field device 44 (alternately connected across the HART load)

Figure 2:
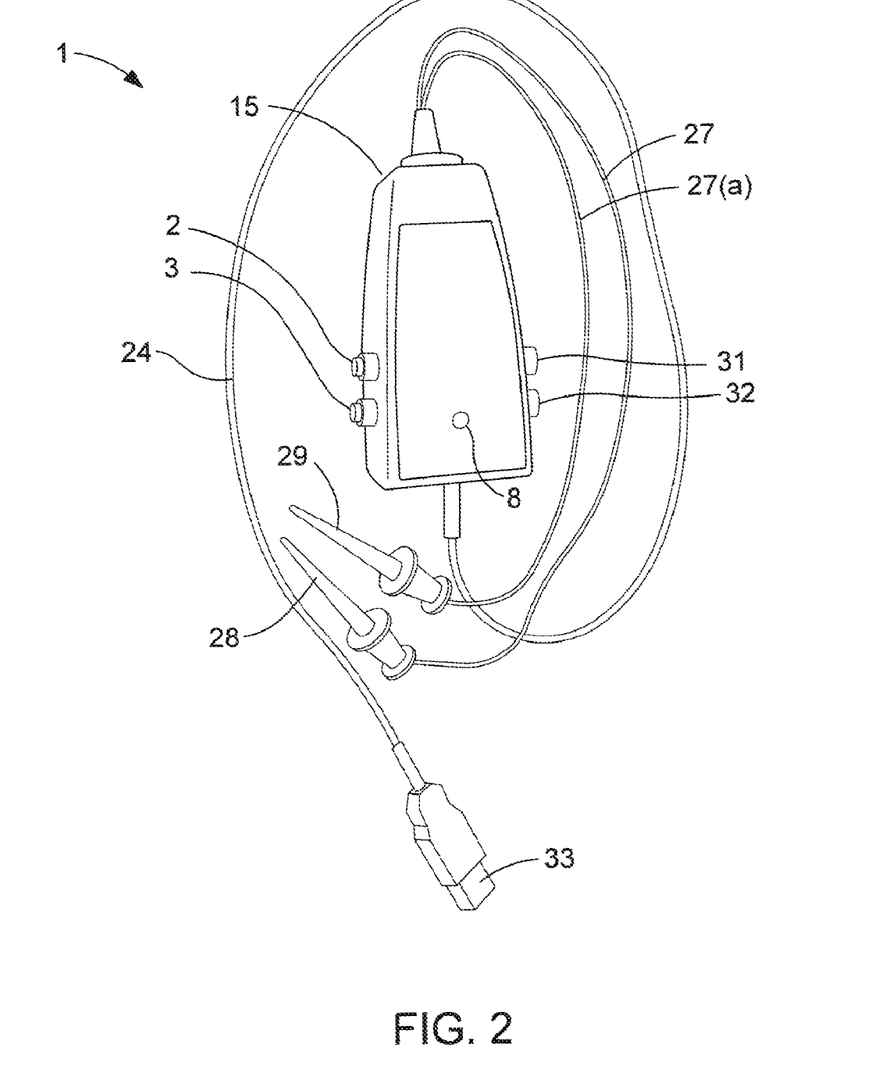
FIG. 2 depicts an overall view of the basic embodiment of the inventive concept, including the wiring leads required to function.

FIG. 2 is a pictorial display of the principle embodiment of the inventive concept showing a power assembly 1 and its casing 15, the cable 24, a USB connector 33 (or other convenient connectors to ports of compatible power source), leads 27, and 27(a) from the power assembly 1 to the two quick disconnects 28, 29, connection ports 2, 3 for use of either a modem or a hand-held communicator, and connection test jacks 31, 32 for connecting to a milliamp meter 20 or digital multimeter (DMM). Also shown in FIG. 2 is a power-on light indication 8 for input power.

Figure 3:
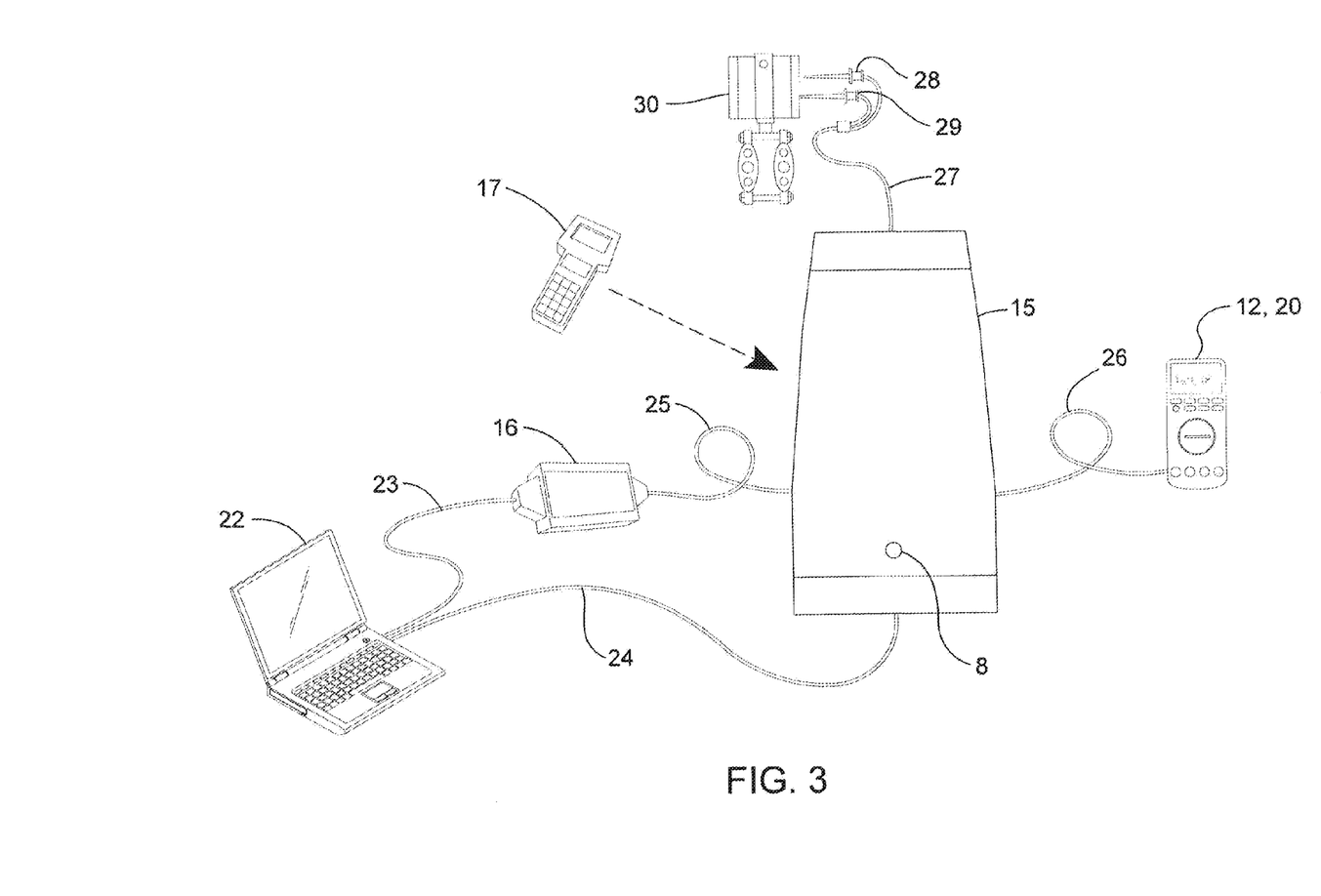
FIG. 3 presents a diagram of the inventive concept, including the power assembly, field device, and other associated equipment.

Operational setup of the inventive concept is further shown in FIG. 3, wherein the power assembly 1 is shown with a wiring arrangement for configuring a HART-enabled field device 30. All wiring leads are properly inserted beginning with the cable 24 from the laptop 22 to the modem 16, to the power assembly 1 input jack(s). The lead wire 23 from the laptop 22 to the HART modem connector(s) 16 and the lead wire 25 from the HART modem connector 16 to the connector(s) 2, 3 on the power assembly 1 is secured. As an alternative, a technician preparing for configuration of the HART field device 30 may choose to use a HART hand-held terminal 17 for device configuration connected to power assembly 1 banana jacks 2 and 3. Alternatively the HART hand-held terminal 17 or HART modem 16 may be connected directly to the HART device 30.

Additional connections include a lead(s) 26 from the power assembly 1 to a milliamp meter 20 or digital multimeter 12, and a cable 27 from the power assembly 1 to two quick disconnect devices 28, 29. The two quick disconnects 28, 29 are then secured to the appropriate terminals of the HART field device 30. Once the laptop 22 is switched on, the power-on light 8 will illuminate to indicate input power.

FIG. 3 demonstrates the method of facilitating the connections necessary for the power assembly 1 to function as intended. A user first connects the cable 24 to an available USB port (or similar port with compatible available power) on a laptop computer 22. Once power is applied, the power-on indicator 8 will illuminate. Color coded for polarity mini-grabbers, or quick disconnect adapters 28, 29 are connected to the power terminals 43 of the HART device 30. The user may connect a HART modem 16, or if preferred, a hand-held communicator 17 to the integral connectors 2, 3 of the power assembly 1. The power assembly 1 may also be equipped with an adapter kit, in the event the laptop 22, the HART modem 16, or hand-held communicator 17 do not have compatible connectors. The user may next connect a milliamp meter 20 or a digital multimeter (DMM) 12 to the test jacks 31, 32 of the power assembly 1 in order to measure the milliamp output from the field device 30. The power assembly 1 includes a current shunt circuit 11 such that the user is not required to break the power loop or un-power the HART device 30 to insert/remove the milliamp meter 12 in/from the current loop.

The quick connection adapters 28, 29 are typically mini-grabber style spring-loaded clips, but may be hard-wired terminals, or any other type of detachable connectors readily found among mechanical quick-disconnect type connectors. When an external modem 16 is used in conjunction with the power assembly 1, it also may be connected by means of any type of quick connection plug, or socket arrangement. The DC power source for the power assembly 1 therefore becomes portable and not confined by a fixed source of convertible AC power. The required DC power input may be via a laptop 22 power supply and compatible connection, or by means of a small battery pack or AC adapter with or without a compatible socket.

Figure 4:
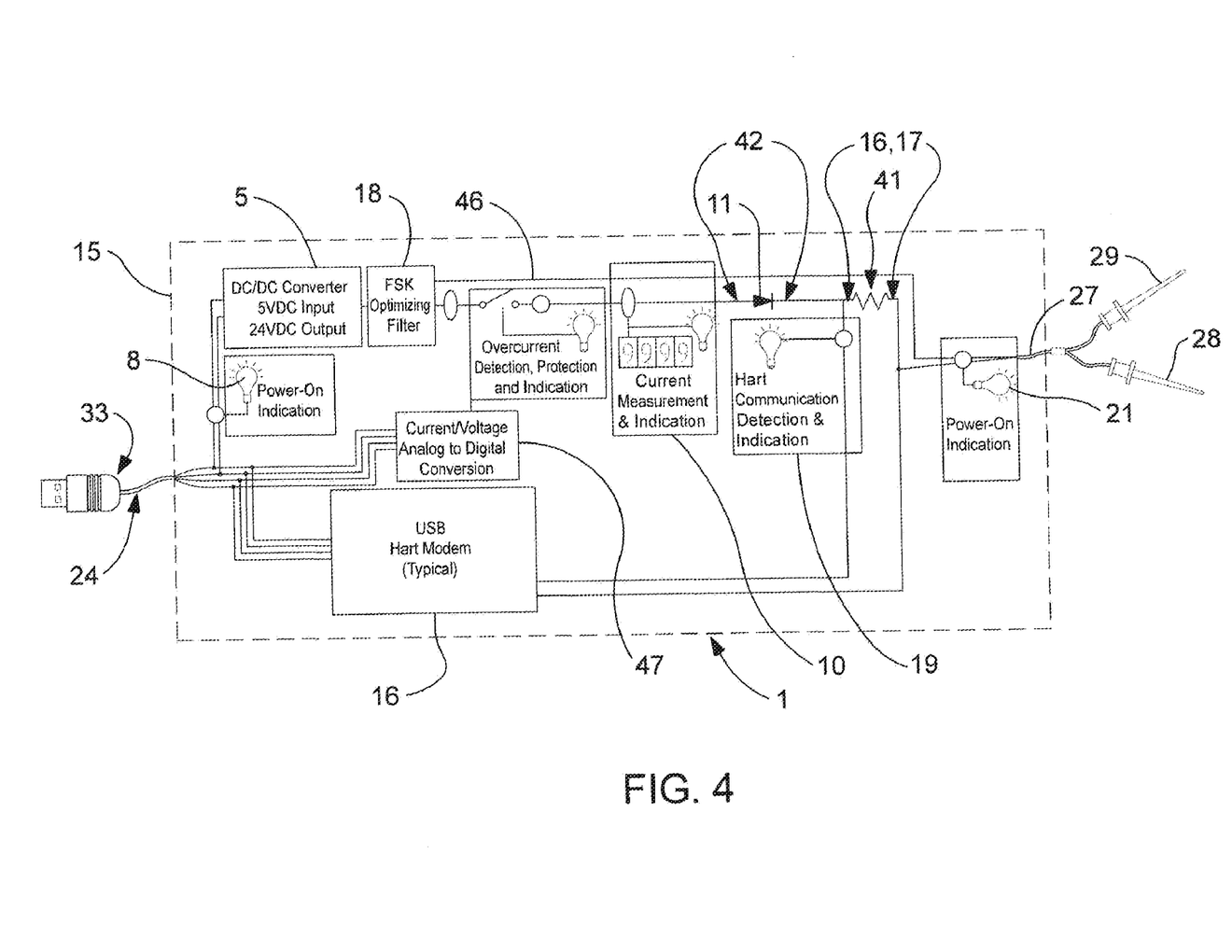
FIG. 4 presents a schematic diagram of the basic inter-related circuitry and components utilized in powering HART-enabled devices.

FIG. 4 presents, within the dashed lines, a schematic diagram of the basic inter-related circuitry and components utilized in an advanced version of the inventive concept. Electrical power from a USB connection 33 is supplied to a DC/DC conversion circuit 5, which boosts the input voltage as necessary, typically from 5v DC to 24v DC, as required by the field device 30. However, the low-voltage power may be supplied by any source capable of supplying sufficient current to power the 2-wire device, nominally 0.5 watts. The power assembly 1 further contains an over-current detection, protection, and indication circuit 46, current measuring and indication circuitry 10, HART frequency-shift keying (FSK) optimizing filter 18, HART communication detection circuitry 19, and ampere/voltage analog to digital conversion circuitry 47 for direct transmission to a computer via the pc connection port. Additionally, a HART modem 16 may be internally wired within the power assembly 1. The HART modem 16 and power assembly 1 may be fabricated together in any convenient fashion and thus one is integral with the other.

Further reviewing of FIG. 4 shows that the DC/DC conversion circuit 5 is connected to the HART Frequency Shift Key (FSK) optimizing filter 18 to optimize the FSK signal and allow the digital component of FSK to bypass the DC voltage input circuit. This arrangement improves FSK signal-to-noise ratio. The DC/DC conversion circuit 5 may be modified by means of an amperage/voltage analog-digital conversion circuit 47 so that current and/or voltage or other electrical or device parameters may be displayed on a laptop 22 or PC. The power output of the HART FSK optimizing filter 18 is connected through a current detecting/limiting, and indicating circuit 46 in order to limit current to acceptable levels and also warn the user that an over-current condition exists. The indication of said circuit 46 may be any digital or analog display, including but not limited to numeric, needle type or LED.

A current shunt diode 11 allows the external connection of a milliamp meter 20 or a digital multimeter (DMM) 12 such that when either meter 12 is connected, virtually all the current is shunted through the meter 12 without having to disconnect the loop and insert probes from the milliamp meter or DMM 12. External connection from the power assembly 1 to either meter 12, 20 is by means of quick-disconnect plugs, jacks or terminals typically used in electrical device connections.

The disclosed power assembly 1 is designed to power one HART field device 30 at a time. The quick disconnect adapters 28, 29 allow the user to move from one field device 30 to another with an absolute minimum of setup time. This feature is particularly valuable when setting up numerous devices on a workbench, for example.

The inventive concept disclosed herein, when used to power and configure HART-enabled field devices 30, includes these internal features:
- the ability to power all 4-20 mA 2-wire HART field devices;
- an internal HART network load 41;
- current measurement connections 42 for a digital multimeter or milliamp meter;
- over-current circuit protection;
- power circuitry to allow operation from a laptop's port or an available AC adapter;
- polarity protection;
- power indicators 8, 21 for both input and output power.

It is also emphasized that the device disclosed herein is adaptable to power and configure field devices utilizing either the Fieldbus or Profibus protocols. The primary difference between HART and Foundation Fieldbus or Profibus PA Fieldbus is the network loading. In general, the HART load resistor 41 is replaced by two terminators that are well defined in the Foundation and Profibus PA physical layer standard. Secondly, the FSK optimizing filter 18 is replaced by a power conditioner 35 for Foundation and Profibus PA. The power conditioner 35 is well defined in the physical layer specification for these protocols.

Figure 5:
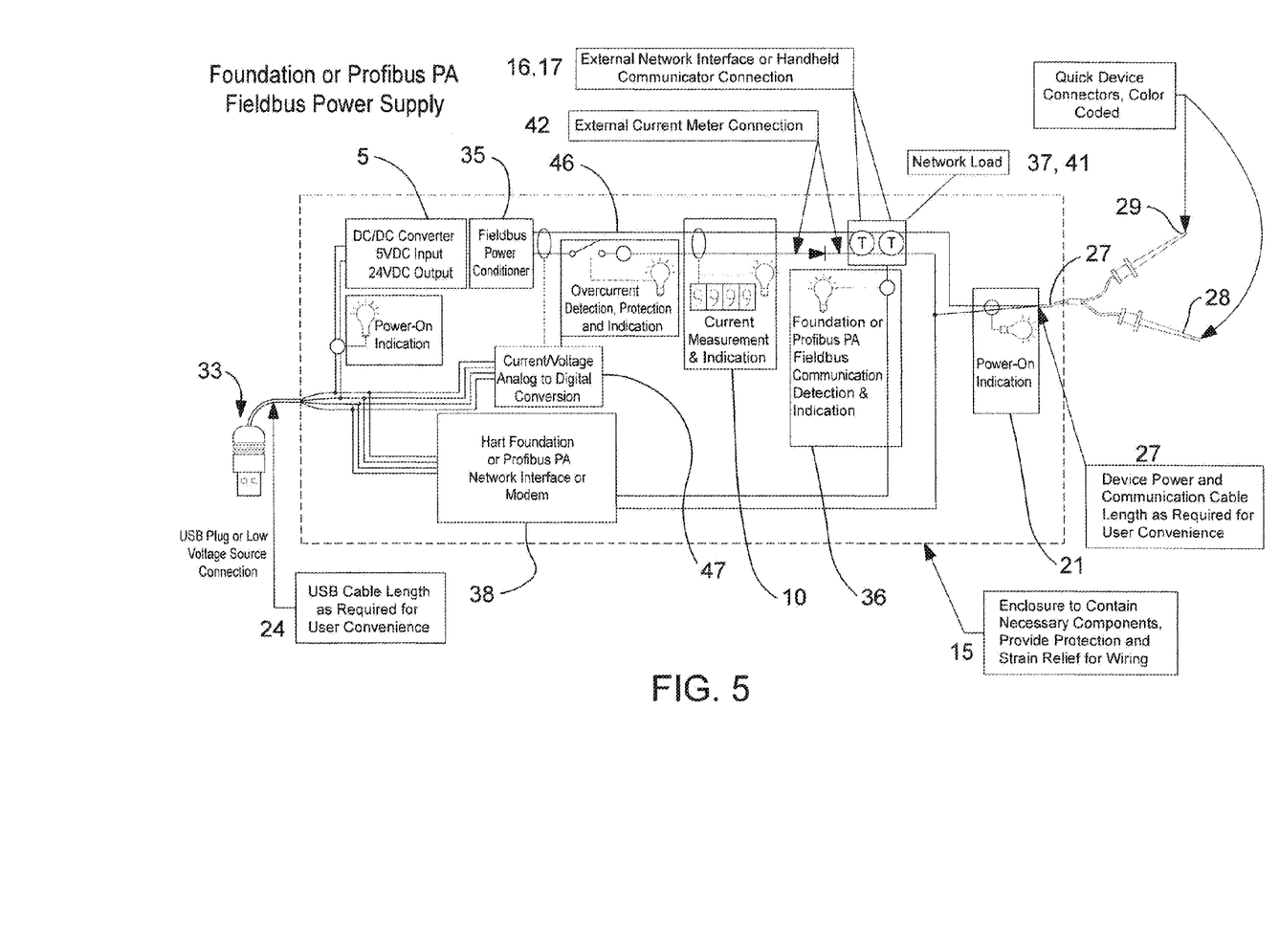
FIG. 5 illustrates a schematic diagram of the inter-related circuitry necessary for powering and configuring devices which utilize Foundation or Profibus PA Fieldbus protocols.

FIG. 5 displays a schematic diagram of the basic power assembly 1 circuitry and components utilized in a different embodiment of the inventive concept. Electrical power from a USB connection 33 is supplied to a DC/DC conversion circuit 5, which boosts the input voltage as necessary, typically from 5v DC to 24v DC, as required by either a Fieldbus or Profibus PA network 2-wire field device. The power assembly 1 further contains an over-current detection, protection, and indication circuit 46, current measuring and indication circuitry 10, Fieldbus power conditioner 35, Fieldbus communication detection circuitry 36, Fieldbus network load 37, a Foundation/Profibus PA modem/network interface 38, and ampere/voltage analog to digital conversion circuitry 47 for direct transmission to a computer via the connection port of a PC or laptop 22. The Foundation/Profibus PA modem 38 and power assembly 1 may be fabricated together in any convenient fashion such that one is integral with the other.

While preferred embodiments of the present inventive concept have been shown and disclosed herein, it will be obvious to those persons skilled in the art that such embodiments are presented by way of example only and not as a limitation to the scope of the inventive concept. Numerous variations, changes, and substitutions may occur or be suggested to those skilled in the art without departing from the intent, scope, and totality of the inventive concept. Such variations, changes, and substitutions may involve other features which are already known per se and which may be used instead of, or in addition, to features already disclosed herein. Accordingly, it is intended that this inventive concept not be limited by the scope of the accompanying claims.

What is claimed is:

1. An apparatus comprising a power assembly for use in powering a 2-wire powered field device for operation to configure or test by digital bus network communication comprising
   power supply circuitry for converting a source voltage into nominal 24-volt DC output voltage;
   a plurality of input power connections between the source voltage and power supply circuitry;
   a network load means for electrically conditioning a communications pathway between a network communications interface and a field device;
   a plurality of output power connections between the power supply circuitry output voltage and the network load means;
   a plurality of network interface connections between the network communication interface and the network load means;
   a plurality of field device connections between the network load means and the field device for conducting power to the field device and conducting network communication signals between the network communication interface and the field device;
   wherein the plurality of source voltage connections and a plurality of network interface connections are arranged within the apparatus to permit the plurality of field device connections to provide the output voltage to the field device and further to conduct communication signals between the field device and the network communication interface and
   wherein the power supply circuitry and network load means are contained within a common casing; and
   wherein the common casing secures the plurality of source voltage connections, the plurality of network interface connections, and the plurality of field device connections.

2. An apparatus comprising a power assembly for use in powering a HART-enabled 2-wire powered field device for operation to configure or test by HART digital network communication comprising
   power supply circuitry for converting a source voltage into a nominal 24-volt DC output voltage;
   a plurality of input power connections between the source voltage and power supply circuitry;
   a HART network load means for electrically conditioning a communications pathway between a network communications interface and a field device;
   a plurality of output power connections between the power supply circuitry output voltage and the HART network load means;
   a plurality of network interface connections between the network communication interface and the HART network load means;
   a plurality of field device connections between the HART network load means and the field device for conducting power to the field device and conducting network communication signals between the network communication interface and the field device;
   wherein the plurality of source voltage connections and a plurality of network interface connections are arranged within the apparatus to permit the plurality of field device connections to provide the output voltage to the field device and further to conduct communication signals between the field device and the network communication interface; and
   wherein the power supply circuitry and HART network load means are contained within a common casing; and
   wherein the common casing secures the plurality of source voltage connections, the plurality of network interface connections, and the plurality of field device connections.

3. An apparatus comprising a power assembly for use in powering a Foundation Fieldbus or Profibus PA Fieldbus 2-wire powered field device for, operation to configure or test by Foundation fieldbus or Profibus PA fieldbus digital network communication comprising
   power supply circuitry for converting a source voltage into a nominal 24-volt DC output voltage;
   a plurality of input power connections between the source voltage and power supply circuitry;
   a Foundation fieldbus or Profibus PA fieldbus network load means for electrically conditioning a communications pathway between a Foundation fieldbus or Profibus PA fieldbus network communications interface and a field device;
   a plurality of output power connections between the power supply circuitry output voltage and the network load means;
   a plurality of network interface connections between the network communication interface and the network load means;
   a plurality of field device connections between the network load means and the field device for conducting power to the field device and conducting network communication signals between the network communication interface and the field device;
   power conditioner as defined by the Foundation Fieldbus or Profibus PA Fieldbus protocol;
   a fieldbus "terminator" as defined for the Foundation Fieldbus or Profibus PA fieldbus protocol;
   wherein the plurality of source voltage connections and the plurality of network interface connections are arranged within the apparatus to permit the plurality of field device connections to provide the output voltage to the field device and further to conduct Foundation fieldbus or Profibus PA fieldbus communication signals between the field device and the Foundation fieldbus or Profibus PA fieldbus network communication interface; and
   wherein the power supply circuitry, power conditioner, and fieldbus terminators are contained within a common casing; and
   wherein the common casing secures the plurality of source voltage, the plurality of network interface, connections, and the plurality of field device connections.

4. The apparatus of claim 1, claim 2, or claim 3, further comprising circuitry for indicating the presence of the source voltage.

5. The apparatus of claim 1, claim 2, or claim 3, further comprising a line voltage adapter suitable for converting a line voltage to a source voltage for the power supply circuitry.

6. The apparatus of claim 1, claim 2, or claim 3, further comprising means for connecting a current measuring device for measuring the current between the power supply circuitry and the field device.

7. The apparatus of claim 1, claim 2, or claim 3 wherein the network communication interface is contained within the common casing.

8. The apparatus claim 1, claim 2, or claim 3 wherein the plurality of network interface connections comprises at least an inductive sensor.

9. The apparatus of claim 1, claim 2, or claim 3 further comprising a power, source contained within the common casing and connected to provide source voltage.

10. The power assembly of claim 1, claim 2, or claim 3 further comprising a connector for connection an external DC battery.

11. A method of powering a HART-enabled field device for configuration, comprising the steps of
providing electrical DC input to an encased power assembly, said assembly capable of supplying 24volt DC power output;
providing a network load;
providing, externally extendable from said power assembly, a pair of electrical wire leads, each lead culminating in a quick disconnect means;
providing a means for connecting a current meter between the power assembly and the field device to measure current supplied to the field device;
providing a means for connecting the network load to a HART modem;
providing a means for attaching the network load to a HART-enabled field device; and
providing a quick disconnect means for attaching output power and the HART modem to the HART-enabled field device; and
providing a common casing for containment of the power supply circuitry and HART network load means.

12. A method of powering a Foundation fieldbus or Profibus PA fieldbus-enabled 2-wire field device for configuration, comprising the steps of
providing electrical DC input to an encased power assembly, said assembly capable of supplying 24-volt DC power output;
providing a fieldbus power conditioner;
providing at least one fieldbus terminator;
providing a fieldbus network load;
providing, externally extendable from said power assembly, a pair of electrical wire leads, each lead culminating in a quick disconnect means;
providing a means for connecting the network load to a Foundation fieldbus or Profibus PA fieldbus network interface;
providing a means for attaching the network load to a Foundation fieldbus or Profibus PA fieldbus-enabled field device;
providing a quick disconnect means for attaching output power and the network interface to the Foundation fieldbus or Profibus PA fieldbus-enabled field device; and
providing a common casing for containment of the power supply circuitry and the Foundation fieldbus or Profibus PA network load means.

13. The apparatus of claim 1, claim 2, or claim 3 further comprising a communication signal filter between the power supply circuitry and the plurality of field device connections to reduce the effect of undesirable noise on the network communication signals between the network communication interface and the field device.

14. The apparatus of claim 1, claim 2, or claim 3, further comprising means for protecting the power supply circuitry and field device from damage resulting from over-current conditions.

15. The apparatus of claim 1, claim 2, or claim 3, further comprising circuitry for measuring current between the power supply circuitry and the field device.

16. The apparatus of claim 15 further comprising circuitry for indicating the measured current between the power supply circuitry and the field device.

17. The apparatus of claim 1, claim 2, or claim 3, further comprising circuitry for indicating the transmission of network communication signals between the network communication interface and the field device.

18. The apparatus of claim 15 further comprising circuitry for converting the measured current between the power supply circuitry and the field device to a digital representation.

19. The apparatus of claim 1, claim 2, or claim 3, wherein the network load means is a resistive load.

20. The apparatus of claim 1, claim 2, or claim 3, wherein the network load means is an inductive load.

21. The apparatus of claim 1, claim 2, or claim 3, further comprising circuitry for indicating the presence of the output voltage.

22. The apparatus of claim 6 wherein the current measuring device may be connected and disconnected without disrupting the power supplied to the field device.

23. The apparatus of claim 7 wherein the network communication interface implements a protocol selected from a group consisting of HART Communication Foundation, Foundation fieldbus, and Profibus PA fieldbus.

24. The apparatus of claim 15 wherein the circuitry for measuring current between the power supply circuitry and the field device comprises at least an inductive sensor.

25. The apparatus of claim 1, claim 2, or claim 3, further comprising power supply circuitry wherein the source voltage is converted into an output voltage in the range of 9 to 48 volts DC.

* * * * *